(12) United States Patent
Azami

(10) Patent No.: US 10,856,351 B2
(45) Date of Patent: Dec. 1, 2020

(54) TRANSFER DEVICE, TRANSFER METHOD FOR TRANSFERRING SOUND SIGNALS IN DIFFERENT COMMUNICATION SYSTEMS

(71) Applicant: JVC KENWOOD Corporation, Yokohama (JP)

(72) Inventor: Tomohiro Azami, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 234 days.

(21) Appl. No.: 16/012,955

(22) Filed: Jun. 20, 2018

(65) Prior Publication Data

US 2018/0302940 A1  Oct. 18, 2018

Related U.S. Application Data

(60) Division of application No. 15/270,024, filed on Sep. 20, 2016, now abandoned, which is a continuation of
(Continued)

(30) Foreign Application Priority Data

Mar. 28, 2014  (JP) .................................. 2014-068821

(51) Int. Cl.
*H04W 76/16* (2018.01)
*H04L 5/00* (2006.01)
(Continued)

(52) U.S. Cl.
CPC ........... *H04W 76/16* (2018.02); *H04L 5/0037* (2013.01); *H04W 76/14* (2018.02); *H04W 76/45* (2018.02); *H04W 4/10* (2013.01); *H04W 88/04* (2013.01)

(58) Field of Classification Search
CPC ..... H04W 76/16; H04W 76/14; H04W 76/45; H04W 88/04; H04W 4/10; H04L 5/0037
See application file for complete search history.

(56) References Cited

U.S. PATENT DOCUMENTS

| | | | | |
|---|---|---|---|---|
| 6,501,736 B1 * | 12/2002 | Smolik | ................. | H04W 28/18 370/252 |
| 2004/0141479 A1 * | 7/2004 | Cha | ........................ | H04W 52/26 370/329 |
| 2006/0229093 A1 * | 10/2006 | Bhutiani | ................. | H04W 4/10 455/518 |

FOREIGN PATENT DOCUMENTS

| | | |
|---|---|---|
| JP | S57143956 A | 9/1982 |
| JP | H06062094 A | 3/1994 |

(Continued)

*Primary Examiner* — Ivan O Latorre
(74) *Attorney, Agent, or Firm* — Brundidge & Stanger, P.C.

(57) ABSTRACT

A first reception unit receives a sound signal destined to a second terminal device in a second communication system supporting one way communication from a first terminal device in a first communication system supporting two way communication. A first transmission unit transmits the sound signal received in the first reception unit to the second terminal device. A second reception unit receives a sound signal destined to the first terminal device from the second terminal device. A second transmission unit transmits the sound signal received in the second reception unit to the first terminal device. A storage unit stores the sound signal received in the first reception unit if the second transmission unit is transmitting the sound signal received in the second reception unit. The first transmission unit transmits the sound signal stored in the storage unit when reception of the sound signal in the second reception unit is completed.

3 Claims, 8 Drawing Sheets

Related U.S. Application Data application No. PCT/JP2014/075160, filed on Sep. 24, 2014.

(51) Int. Cl.
*H04W 76/45* (2018.01)
*H04W 76/14* (2018.01)
*H04W 4/10* (2009.01)
*H04W 88/04* (2009.01)

(56) References Cited

FOREIGN PATENT DOCUMENTS

| | | |
|---|---|---|
| JP | 2000004474 A | 1/2000 |
| WO | 2007116722 A1 | 10/2007 |
| WO | WO-2012059051 A1 * 5/2012 ............. H04L 65/60 |

* cited by examiner

US 10,856,351 B2

TRANSFER DEVICE, TRANSFER METHOD FOR TRANSFERRING SOUND SIGNALS IN DIFFERENT COMMUNICATION SYSTEMS

CROSS-REFERENCE TO RELATED APPLICATION

This application is Divisional Application of U.S. application Ser. No. 15/270,024, filed Sep. 20, 2016; which claims the benefit of priority from the prior Japanese Patent Application No. 2014-68821, filed on Mar. 28, 2014, the entire contents of which are incorporated herein by reference.

BACKGROUND OF THE INVENTION

1. Field

The present invention relates to transfer technology and, more particular, to transfer devices and transfer methods for transferring sound signals in different communication systems.

2. Description of the Related Art

Communication systems that allow communication between a radio unit of a mobile station and a telephone unit connected to a fixed-line telephone network are known (e.g., patent document 1). However, when a radio unit operating in the simplex communication (half duplex) scheme and a telephone unit operating in the complex communication (full duplex) scheme communicate via a base station, the user of the radio unit cannot hear the sound sent from the telephone unit while the radio unit is transmitting a signal. A technology is known adapted to a wireless telephone device including a telephone main unit provided with a means for storing a message associated with a transfer request instruction from a telephone subunit at the source of transfer and reading the message and adding the message to a transfer request instruction to a telephone subunit at the destination of transfer so that wireless connection can be established only with one telephone subunit at a time. The technology is capable of transferring a message from the telephone subunit at the source of transfer to the telephone subunit at the destination of transfer via the telephone main unit, by using a temporary message storage function of the telephone main unit (see, for example, patent document 2). [0006] [patent document 1] Japanese Patent Application Publication No. 2000-4474 [0007] [patent document 2] Japanese Patent Application Publication No. Hei6-62094

In a business wireless system, a group including a plurality of terminal devices is formed and a base station device assigns a channel to each group. In a business wireless system like this, intra-group phone calls are mainly used and communication takes place in one-to-multiple mode. The terminal device transmitting a sound signal in the business wireless system cannot receive a sound signal, and the terminal device receiving a sound signal cannot transmit a sound signal. Therefore, the business wireless system supports one way phone calls. Meanwhile, mobile communication systems support two way phone calls. To improve usability for users, interconnection between a business wireless system and a mobile communication system is required. In this process, a business wireless terminal device according to the related art notifies the user of a mobile communication terminal device of an end of transmission by transmitting a beep sound to the mobile communication terminal device at the end of transmission.

However, users of a mobile communication terminal device are not used to one way communication and so often start talking even while the business wireless terminal device is transmitting a signal. In particular, the likelihood is high that the user of the mobile communication terminal device starts talking in the middle of transmission from the business wireless terminal device if, for example, a slight break occurs while the user of the business wireless terminal device is talking. As a result, the user of the business wireless communication device cannot hear the sound originated by the user of the mobile communication terminal device in the middle of transmission from the business wireless terminal device.

SUMMARY

To address the aforementioned issue, a transfer device according to an embodiment comprises: a first reception unit that receives a sound signal destined to a second terminal device in a second communication system supporting one way communication from a first terminal device in a first communication system supporting two way communication; a first transmission unit that transmits the sound signal received in the first reception unit to the second terminal device; a second reception unit that receives a sound signal destined to the first terminal device from the second terminal device; a second transmission unit that transmits the sound signal received in the second reception unit to the first terminal device; and a storage unit that stores the sound signal received in the first reception unit if the second transmission unit is transmitting the sound signal received in the second reception unit. If the sound signal is started to be stored in the storage unit while the second transmission unit is transmitting the sound signal received in the second reception unit, the second transmission unit reduces a speech speed in transmitting the sound signal received in the second reception unit, the first transmission unit transmits the sound signal stored in the storage unit when reception of the sound signal in the second reception unit is completed, and the second transmission unit adjusts the speech speed so that a point of time when transmission of the sound signal received in the second reception unit is completed approximates a point of time when transmission of the sound signal in the first transmission unit is completed.

Another embodiment also relates to a transfer device. The device comprises: a first reception unit that receives a sound signal destined to a second terminal device in a second communication system supporting one way communication from a first terminal device in a first communication system supporting two way communication; a first transmission unit that transmits the sound signal received in the first reception unit to the second terminal device; a second reception unit that receives a sound signal destined to the first terminal device from the second terminal device; a second transmission unit that transmits the sound signal received in the second reception unit to the first terminal device; a storage unit that stores the sound signal received in the first reception unit while the second transmission unit is transmitting the sound signal received in the second reception unit; and a detection unit that detects reception of the sound signal in the first reception unit while the second transmission unit is transmitting the sound signal received in the second reception unit. The first transmission unit transmits the sound signal stored in the storage unit when the reception of the sound signal in the second reception unit is completed, and, when the detection unit detects reception, the first transmission unit transmits a control signal to the second terminal device.

Still another embodiment relates to a transfer method. The method comprises: receiving a sound signal destined to a second terminal device in a second communication system supporting one way communication from a first terminal device in a first communication system supporting two way communication; transmitting the sound signal received from the first terminal device to the second terminal device; receiving a sound signal destined to the first terminal device from the second terminal device; transmitting the sound signal received from the second terminal device to the first terminal device; and storing the sound signal received from the first terminal device in a memory if the sound signal from the second terminal device is being transmitted to the first terminal device. If the sound signal is started to be stored in said storing in the memory while the sound signal received from the second terminal device is being transmitted, said transmitting to the first terminal device reduces a speech speed in transmitting the sound signal received from the second terminal device, said transmitting to the second terminal device transmits the sound signal stored in the memory when reception of the sound signal from the second terminal device is completed, and said transmitting to the first terminal device adjusts the speech speed so that a point of time when transmission of the sound signal received from the second terminal device is completed approximates a point of time when transmission of the sound signal in said transmitting of the sound signal stored in the memory to the second terminal device is completed.

Still another embodiment also relates to a transfer method. The method comprises: receiving a sound signal destined to a second terminal device in a second communication system supporting one way communication from a first terminal device in a first communication system supporting two way communication; transmitting the sound signal received from the first terminal device to the second terminal device; receiving a sound signal destined to the first terminal device from the second terminal device; transmitting the sound signal received from the second terminal device to the first terminal device; storing the sound signal received from the first terminal device in a memory if the sound signal from the second terminal device is being transmitted to the first terminal device; transmitting the sound signal stored in the memory to the second terminal device when reception of the sound signal from the second terminal device is completed; and detecting reception of the sound signal from the first terminal device while the sound signal received from the second terminal device is being transmitted to the first terminal device. Said transmitting of the sound signal stored in the memory to the second terminal device transmits a control signal to the second terminal device when said detecting detects the reception.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Embodiment 1

A brief summary will be given before describing the invention in specific details. Embodiment 1 relates to a transfer device for transferring a sound signal between a first communication system supporting two way communication and a second communication supporting one way communication. For example, the first communication system is a mobile communication system and the second communication system is a business wireless system. In the mobile communication system, two way communication between terminal devices is enabled by using a base station device to assign an upstream channel and a downstream channel to each terminal device. In the business wireless system, a plurality of terminal devices form a group. The base station device assigns an upstream channel and a downstream channel to a group. In this setup, one of the terminal devices in a group (hereinafter, referred to as "transmitting device") transmits a signal using the upstream channel, and another terminal device in the group (hereinafter, referred to as "receiving device") receives the signal using the downstream channel. Base station devices other than the base station device to which the transmitting device is connected also assign a downstream channel to the group so that the receiving device connected to the other base station device can also receive the signal. A similar process is performed in the other groups but communication between different groups does not take place.

If these systems are interconnected, there is a disadvantage in that the user of the terminal device of the business wireless system cannot hear the sound originated by the user of the terminal device of the mobile communication system while the terminal device of the business wireless is transmitting a signal, as mentioned above. In this background, Example 1 is directed to the purpose of allowing the user of the terminal device of the business wireless communication device to hear the sound originated by the user of the terminal device of the mobile communication system while the terminal device of the business wireless is transmitting a signal. The transfer device according to Embodiment 1 buffers the sound from the terminal device of the mobile communication system while the terminal device of the business wireless system is transmitting a signal. The transfer device transmits the sound to the terminal device of the business wireless system after the transmission from the terminal device of the business wireless system is completed.

Figure 1:
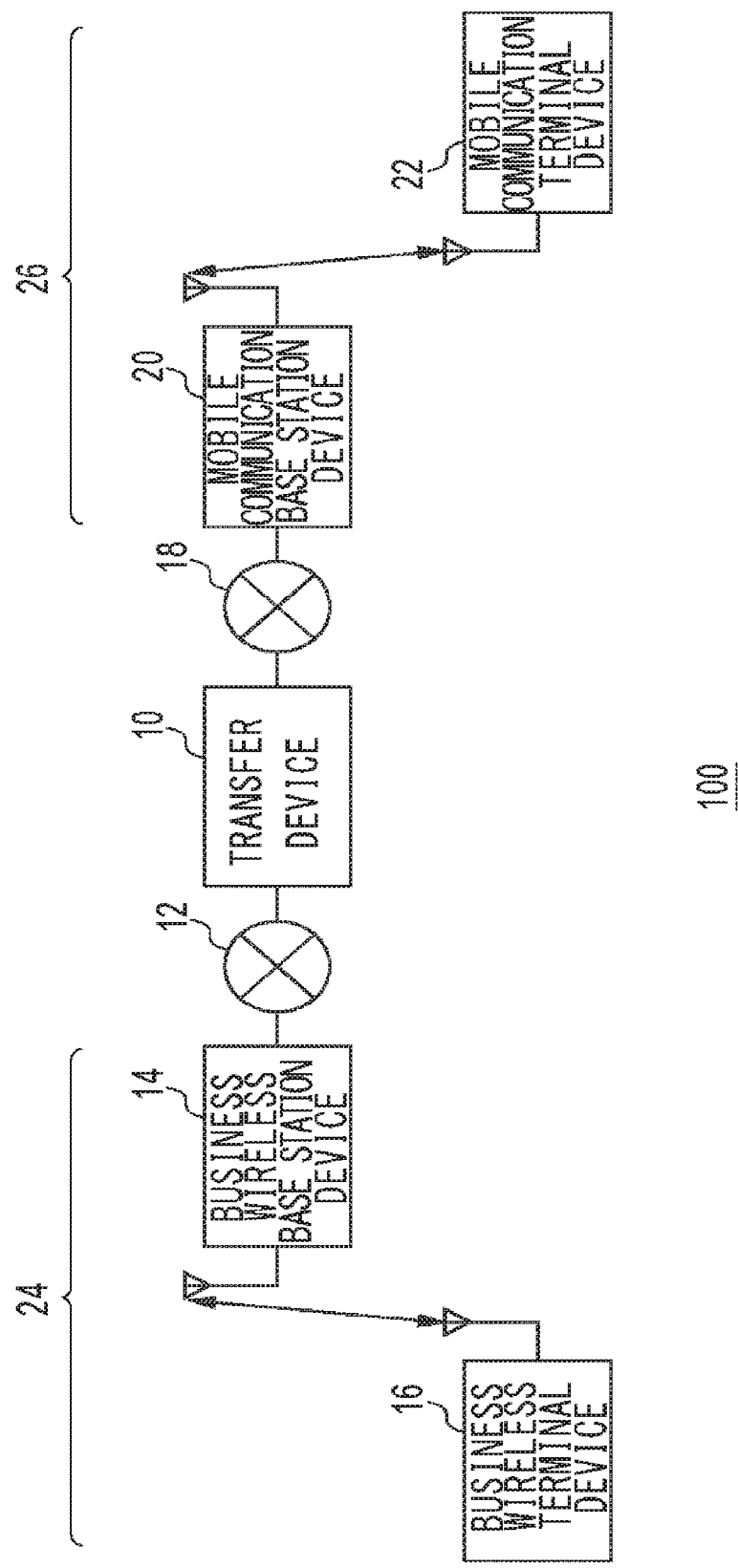
FIG. 1 shows a configuration of a communication system according to Embodiment 1.

FIG. 1 shows a configuration of a communication system 100 according to Embodiment 1. The communication system 100 includes a transfer device 10, a business wireless network 12, a business wireless base station device 14, a business wireless terminal device 16, a mobile communication network 18, a mobile communication base station device 20, and a mobile communication terminal device 22. The business wireless network 12, the business wireless base station device 14, and the business wireless terminal device 16 are included in the business wireless system 24. The mobile communication network 18, the mobile communication base station device 20, and the mobile communication terminal device 22 are included in the mobile communication system 26. For brevity, FIG. 1 shows one each of the business wireless base station device 14, the business wireless terminal device 16, the mobile communication base station device 20, and the mobile communication terminal device 22. The number of each of these devices is not limited to "1".

The business wireless base station device 14 is connected to another business wireless base station device 14 (not shown) via the business wireless network 12. The business wireless base station device 14 is capable of assigning a plurality of channels and assign the channels to groups. A known technology may be used for the channels. By way of example, it will be assumed that the plurality of channels are multiplexed by Time Division Multiple Access (TDMA)/Frequency Division Duplex (FDD). For example, one upstream channel is used as an upstream control channel, and one downstream channel is used as a downstream control channel. The upstream control channel is transmitted by random access.

The business wireless terminal device 16 is a wireless terminal capable of communicating with another business wireless terminal device 16 (not shown) via the business wireless base station device 14. Phone-call communication is assumed herein. Data communication may also take place. Upon entering an area where communication with the business wireless base station device 14 is enabled, the business wireless terminal device 16 requests the business wireless base station device 14 to register the location of the business wireless terminal device 16 and register the business wireless terminal device 16 in a group. In response to the request, the business wireless base station device 14 registers the business wireless terminal device 16 in a group.

When a call is originated in one of the business wireless terminal devices 16, the calling business wireless terminal device 16 uses the upstream control channel to transmit a call origination request. The business wireless base station device 14 receiving the upstream control channel signal defines the calling business wireless terminal device 16 as the transmitting device and assigns channels to the group in which the transmitting device is included. The term "channels" here generically refers to downstream channels and upstream channels. The business wireless base station device 14 requests the other business wireless base station devices 14 to assign channels to the group via the business wireless network 12. In response to the request, the other business wireless base station devices 14 examine whether the group is registered. If the group is registered, the other business wireless base station devices 14 assign channels to the group.

The business wireless base station device 14 and the other business wireless base station devices 14 transmit downstream control channel signals including information on the assigned channels to the business wireless terminal devices 16. The rest of the business wireless terminal devices 16 included in the group (receiving devices) as well as the transmitting device recognize the assigned channels by receiving the downstream control channel signals. The transmitting device transmits a signal to the business wireless base station device 14 using the assigned upstream channel. The signal includes a digitized sound signal. If a receiving device is included in the group in which the transmitting device is included, the business wireless base station device 14 transmits the signal to the receiving device using the assigned downstream channel. In addition, the business wireless base station device 14 transmits the received signal to the other business wireless base station devices 14. The other business wireless base station devices 14 transmit the signal to the receiving devices using the assigned downstream channel. The receiving devices play back the sound signal based on the received signal and output the sound from the speaker.

In this way, a plurality of groups each including a plurality of business wireless terminal devices 16 are formed. Each of the plurality of business wireless base station devices 14 assigns channels to each group. As a result, communication takes place from one of the business wireless terminal devices 16 included in a group to which the channels are assigned to the rest of the business wireless terminal devices 16 included in the group. In the plurality of business wireless terminal devices 16 included in a group, the transmitting device and the receiving device may change their roles. If a signal that should be transmitted is generated in the business wireless terminal device 16 operating as the receiving device, the business wireless terminal device 16 is switched into a transmitting device by transmitting an upstream control channel signal including a call origination request, as described above. The business wireless terminal device 16 operating as the transmitting device is switched into a receiving device once the business wireless terminal device 16 completes the transmission of the signal. Thus, the business wireless terminal device 16 operates as one of a transmitting device and a receiving device, one way communication is enabled by the business wireless terminal device 16.

The mobile communication network 18, the mobile communication base station device 20, and the mobile communication terminal device 22 are included in the mobile communication system 26 as described above. For example, the mobile communication system 26 is a third-generation cell phone system. The mobile communication base station device 20 assigns a combination of a downstream channel and an upstream channel to a mobile communication terminal device 22. For this reason, the mobile communication terminal device 22 enables two way communication.

One end of the transfer device 10 is connected to the business wireless network 12 and the other is connected to the mobile communication network 18. The transfer device 10 supports mutual communication between the business wireless system 24 and the mobile communication system 26. To describe it in specific details, the transfer device 10 transfers a sound signal from the business wireless terminal device 16 to the mobile communication terminal device 22 and transfers a sound signal from the mobile communication terminal device 22 to the business wireless terminal device 16. The configuration for connecting from the business wireless terminal device 16 to the mobile communication terminal device 22 based on a telephone number is disclosed in patent document 1 mentioned above so that a description thereof is omitted.

Figure 2:
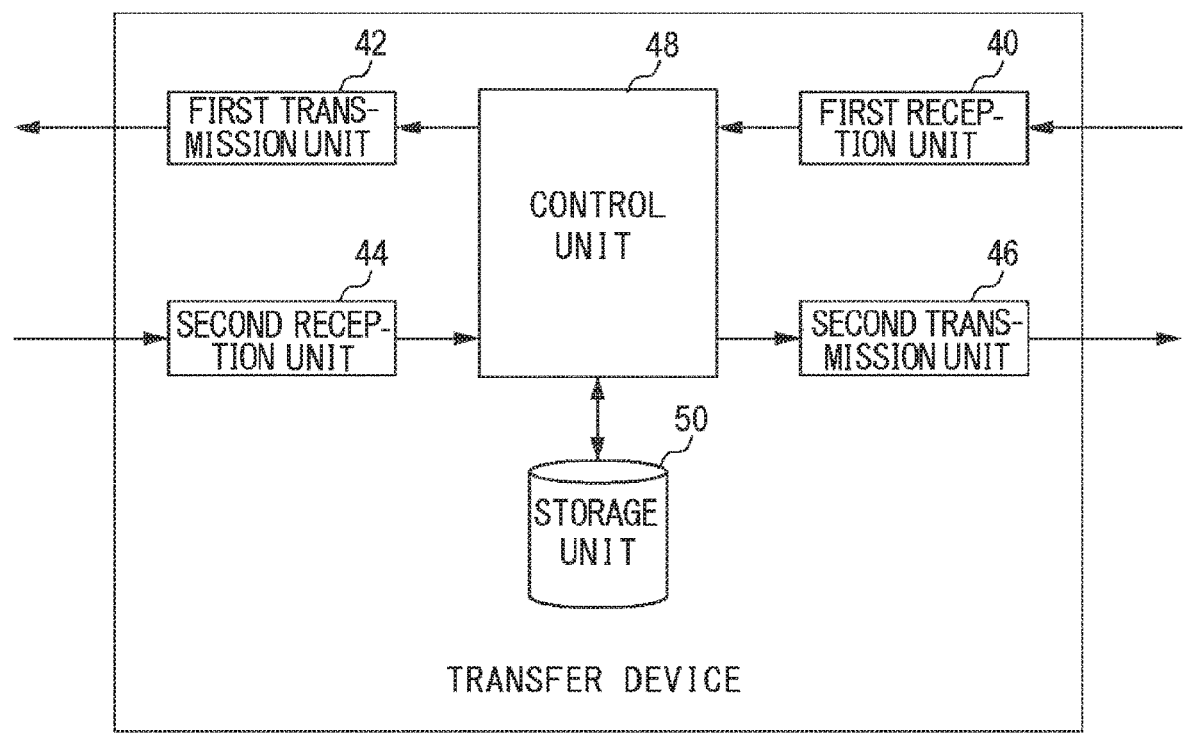
FIG. 2 shows a configuration of the transfer device of FIG. 1.

FIG. 2 shows a configuration of the transfer device 10. The transfer device 10 includes a first reception unit 40, a first transmission unit 42, a second reception unit 44, a second transmission unit 46, a control unit 48, and a storage unit 50. The first reception unit 40 is connected to a mobile communication network 18 (not shown). The first reception unit 40 receives a sound signal destined to the business wireless terminal device 16 from the mobile communication terminal device 22 via the mobile communication base station device 20 and the mobile communication network 18. As described above, the mobile communication terminal device 22 is included in the mobile communication system 26 supporting two way phone calls, and the business wireless terminal device 16 is included in the business wireless system 24 supporting one way phone calls.

The first transmission unit 42 is connected to the business wireless network 12 (not shown). The first transmission unit 42 transmits the sound signal received in the first reception unit 40 to the business wireless terminal device 16 via the business wireless network 12 and the business wireless base station device 14. The second reception unit 44 is connected to the business wireless network 12 (not shown). The second reception unit 44 receives the sound signal destined to the mobile communication terminal device 22 from the business wireless terminal device 16 via the business wireless base station device 14 and the business wireless network 12. The second transmission unit 46 is connected to the mobile communication network 18 (not shown). The second transmission unit 46 transmits the sound signal received in the second reception unit 44 to the mobile communication terminal device 22 via the mobile communication network 18 and the mobile communication base station device 20.

The processes described so far relate to transfer of a sound signal between the business wireless system 24 and the mobile communication system 26. A description will be given hereinafter of a process performed when a sound signal destined to the business wireless terminal device 16 is transmitted by the mobile communication terminal device 22 while the business wireless terminal device 16 is transmitting a signal. When the first reception unit 40 receives a sound signal, the control unit 48 examines whether the second reception unit 44 is receiving a sound signal from the business wireless terminal device 16 that is the destination of the sound signal received by the first reception unit 40. If the second reception unit 44 is receiving the sound signal, the control unit 48 stores the sound signal received in the first reception unit 40 in the storage unit 50 instead of transmitting the sound signal from the first transmission unit 42.

The storage unit 50 is a recording medium connected to the control unit 48. Upon receiving the sound signal from the control unit 48, the storage unit 50 stores the sound signal. The sound signal is a digital signal. Storage in the storage unit 50 is continued until the reception of the sound signal in the first reception unit 40 is completed. In other words, the storage unit 50 stores the sound signal received in the first reception unit 40 while the second transmission unit 46 is transmitting the sound signal received in the second reception unit 44.

The control unit 48 detects the completion of transmission of the sound signal in the second reception unit 44. Upon detecting the completion, the control unit 48 causes the first transmission unit 42 to transmit the sound signal stored in the storage unit 50. When the reception of the sound signal in the second reception unit 44 is completed, the first transmission unit 42 transmits the sound signal stored in the storage unit 50 in accordance with an instruction from the control unit 48.

A description will now be given of a case where the first reception unit 40 receives a sound signal while the second reception unit 44 is receiving a sound signal, and, the reception of the sound signal in the second reception unit 44 is completed by the time the reception of the sound signal in the first reception unit 40 is completed. Even if the reception of the sound signal in the second reception unit 44 is completed while the storage unit 50 is storing the sound signal received in the first reception unit 40, the control unit 48 causes the storage unit 50 to continue to store the sound signal received in the first reception unit 40. The storage unit 50 continues to store the sound signal in accordance with an instruction from the control unit 48.

When the reception of the sound signal in the second reception unit 44 is completed, the control unit 48 causes the first transmission unit 42 to transmit the sound signal stored in the storage unit 50 in the order of storage. The first transmission unit 42 transmits the sound signal in the order of storage in accordance with an instruction from the control unit 48. Thus, the sound signal is transferred from the mobile communication terminal device 22 to the business wireless terminal device 16 with a delay of a predetermined duration in the situation described above. The predetermined duration is defined to be longer than a time difference between the point of time when the first reception unit 40 receives a sound signal while the second reception unit 44 is receiving a sound signal and the point of time when the reception of the sound signal in the second reception unit 44 is completed.

When the transmission in the business wireless terminal device 16 is completed and while the sound signal stored in the storage unit 50 is being transmitted to the business wireless terminal device 16, a silence is created in the mobile communication terminal device 22. In a silence, the user of the mobile communication terminal device 22 may start talking again. Therefore, the control unit 48 may transmit an announcement sound, beep sound, or the like indicating that the business wireless terminal device 16 is receiving a signal to the mobile communication terminal device 22 via the second transmission unit 46, the mobile communication network 18, and the mobile communication base station device 20. The following process may further be performed in order to prevent a silence.

If the storage of the sound signal in the storage unit 50 is completed while the second transmission unit 46 is transmitting the sound signal received in the second reception unit 44, the control unit 48 reduces the speech speed in transmitting, from the second transmission unit 46, the sound signal received in the second reception unit 44. The reduced speech speed may be predetermined. The second transmission unit 46 transmits the sound signal with a reduced speech speed to the mobile communication terminal device 22 in accordance with an instruction from the control unit 48.

When the reception of the sound signal in the second reception unit 44 is completed, the control unit 48 adjusts the speech speed of the sound signal transmitted from the second transmission unit 46 so that the point of time when the transmission of the sound signal from the second transmission unit 46 is completed approximates the point of time when the transmission of the sound signal from the first transmission unit 42 is completed. The term "approximates" means that the points of time coincide within the margin of error. For example, the control unit 48 calculates the period of time elapsed until the sound signal stored in the storage unit 50 is completely transmitted from the first transmission unit 42. Further, the control unit 48 identifies the data volume of the sound signal that should be transmitted from the second transmission unit 46. Further, the control unit 48 derives the speech speed based on the period of time and data volume calculated. The second transmission unit 46 transmits the sound signal with an adjusted speech speed to the mobile communication terminal device 22 in accordance with an instruction from the control unit 48. The speed of speech transmitted from the second transmission unit may be reduced since the point of time when the reception of the sound signal in the first reception unit 40 is started.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 3:
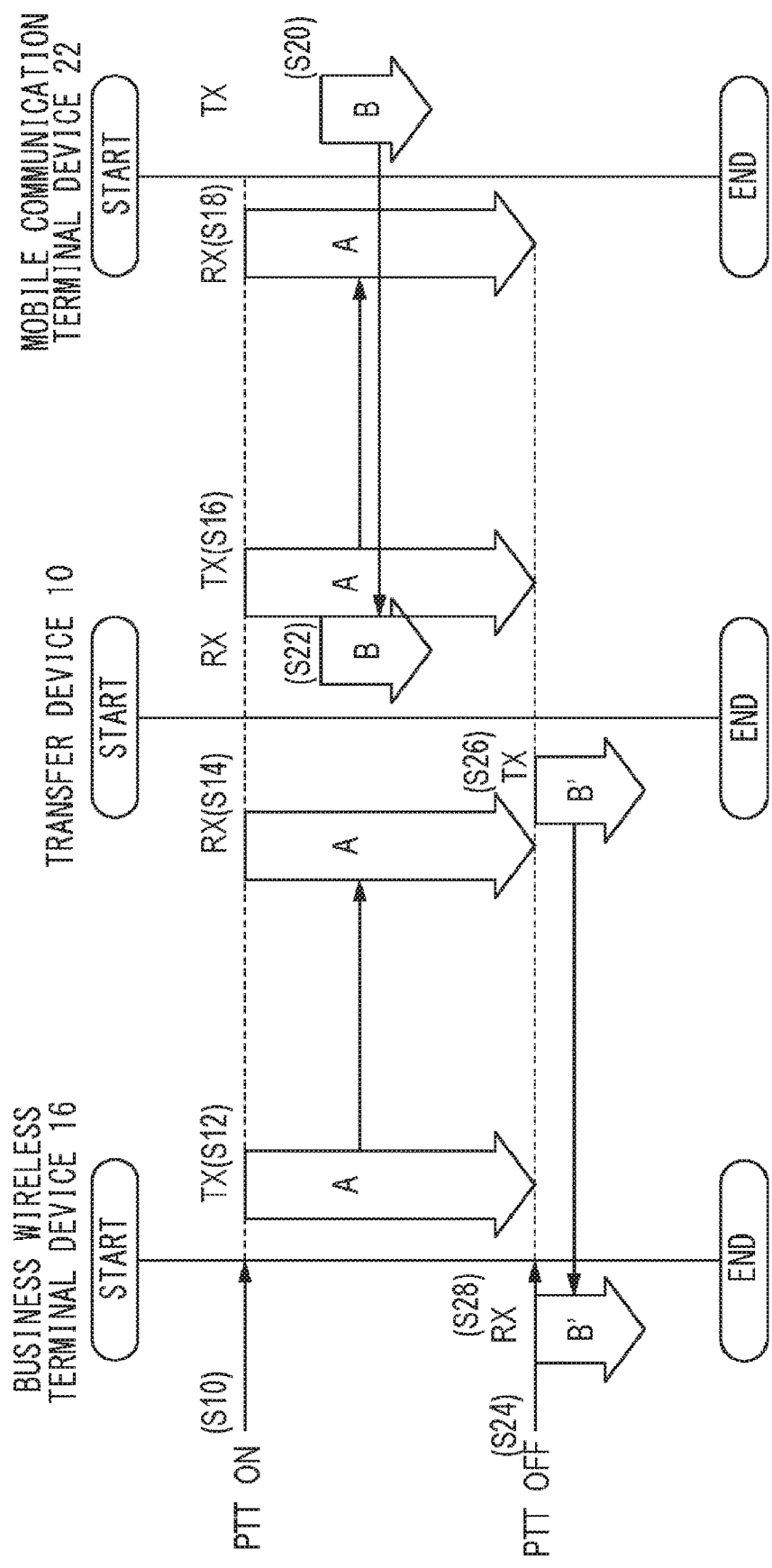
FIG. 3 shows steps of transfer by the communication system of FIG. 1.

A description will now be given of the operation of the communication system 100 with the above configuration. FIG. 3 shows steps of transfer by the communication system 100. PTT is turned on in the business wireless terminal device 16 (S10). The business wireless terminal device 16 transmits a sound signal A (S12). The transfer device 10 receives the sound signal A (S14) and transmits the sound signal A (S16). The mobile communication terminal device 22 receives the sound signal A (S18). The mobile communication terminal device 22 transmits a sound signal B (S20). The transfer device 10 receives the sound signal B (S22). PTT is turned off in the business wireless terminal device 16 (S24). The transfer device 10 transmits a sound signal B' (S26). The sound signal B' represents the sound signal B stored in the storage unit 50. The business wireless terminal device 16 receives the sound signal B' (S28).

Figure 4:
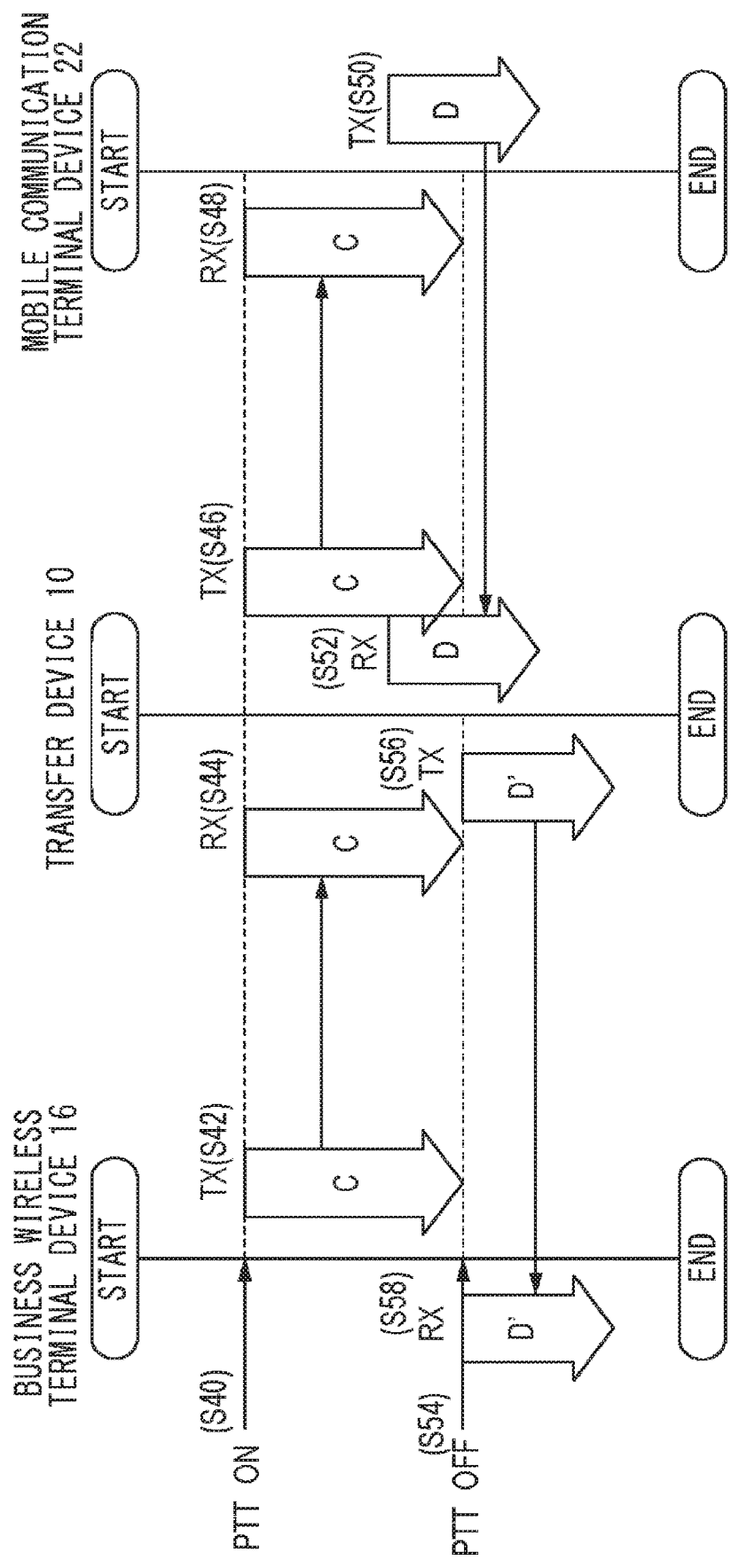
FIG. 4 shows alternative steps of transfer by the communication system of FIG. 1.

FIG. 4 shows alternative steps of transfer by the communication system 100. PTT is turned on in the business wireless terminal device 16 (S40). The business wireless terminal device 16 transmits a sound signal C (S42). The transfer device 10 receives the sound signal C (S44) and transmits the sound signal C (S46). The mobile communication terminal device 22 receives the sound signal C (S48). The mobile communication terminal device 22 transmits a sound signal D (S50). The transfer device 10 receives the sound signal D (S52). PTT is turned off in the business wireless terminal device 16 (S54). The transfer device 10 transmits a sound signal D' while continuing the reception of the sound signal D (S56). The sound signal D' represents the sound signal D stored in the storage unit 50. The business wireless terminal device 16 receives the sound signal D' (S58).

Figure 5:
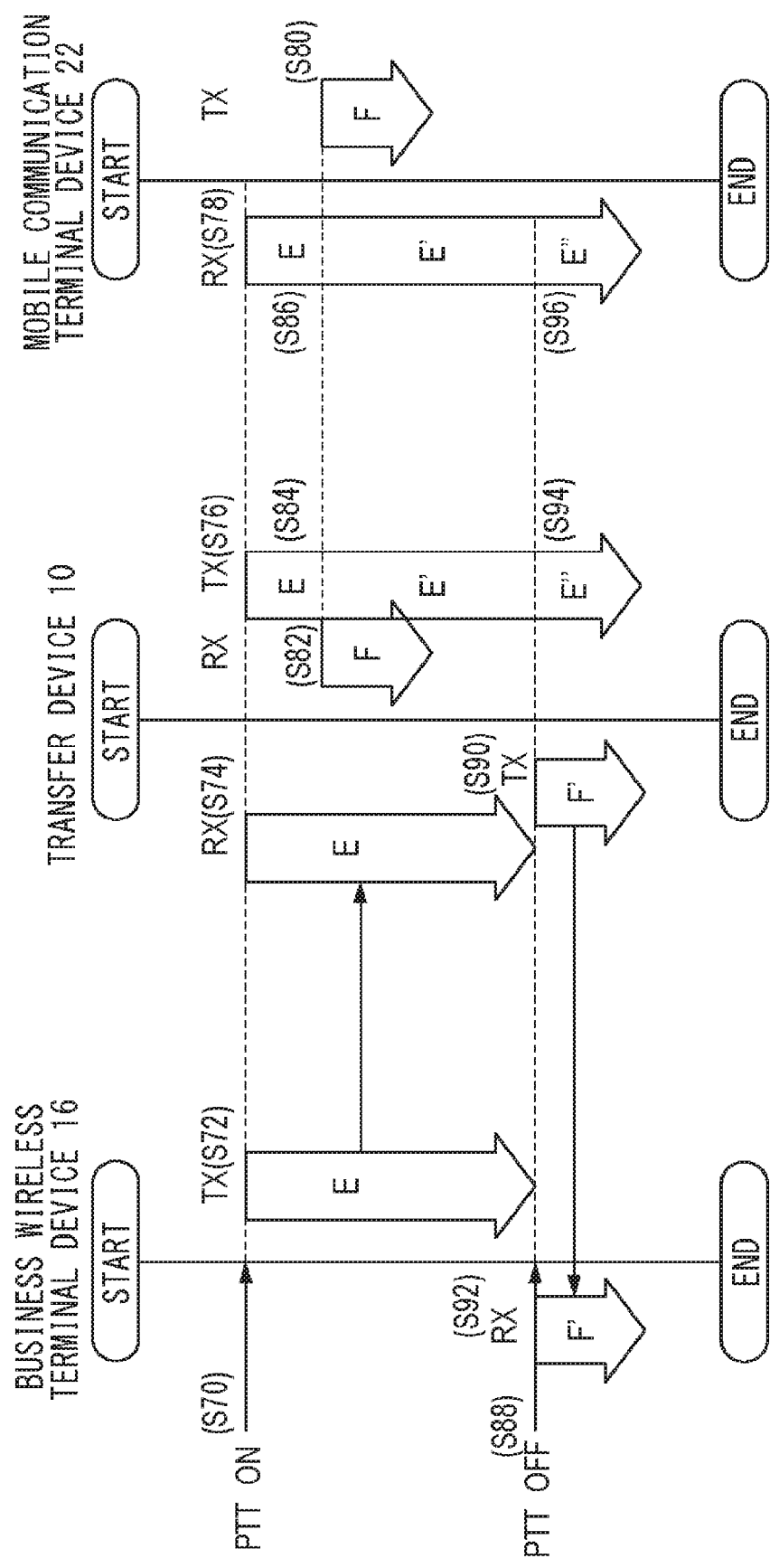
FIG. 5 shows alternative steps of transfer by the communication system of FIG. 1.

FIG. 5 shows alternative steps of transfer by the communication system 100. PTT is turned on in the business wireless terminal device 16 (S70). The business wireless terminal device 16 transmits a sound signal E (S72). The transfer device 10 receives the sound signal E (S74) and transmits the sound signal E (S76). The mobile communication terminal device 22 receives the sound signal E (S78). The mobile communication terminal device 22 transmits a sound signal F (S80). The transfer device 10 receives the sound signal F (S82). When the reception of the sound signal F is started, the transfer device 10 transmits a sound signal E' (S84). The sound signal E' is a version of the sound signal E with a reduced speech speed. The mobile communication terminal device 22 receives the sound signal E' (S86).

PTT is turned off in the business wireless terminal device 16 (S88). The transfer device 10 transmits a sound signal F' (S90). The sound signal F' represents the sound signal F stored in the storage unit 50. The business wireless terminal device 16 receives the sound signal F' (S92). The transfer device 10 transmits a sound signal E" (S94). The sound signal E" is a version of the sound signal E with an adjusted speech speed. The mobile communication terminal device 22 receives the sound signal E" (S96).

According to the embodiment, the sound signal received in the first reception unit is stored while the second transmission unit is transmitting the sound signal received in the second reception unit. When the reception of the sound signal in the second reception unit is completed, the sound signal stored in the storage unit is transmitted from the first transmission unit. Therefore, the sound can be properly transferred where different communication systems are interconnected. Further, the sound output by the user of the mobile communication terminal device while the business wireless terminal device is transmitting a signal can be heard by the user of the business wireless terminal device. The embodiment can also help avoid a situation where the user of the mobile communication terminal device is asked to repeat the speech. Further, the sound signal in the storage unit is transmitted in the order of storage when the reception of the sound signal in the second reception unit is completed so that the sound signal is transferred smoothly. The speech speed is adjusted so that the point of time when the transmission of the sound signal received in the second reception unit is completed approximates the point of time when the transmission of the sound signal from the first transmission unit is completed. Therefore, a silence is prevented from being created.

Embodiment 2

A description will now be given of Embodiment 2. Like Embodiment 1, Embodiment 2 relates to a transfer device for transferring a sound signal between a first communication system supporting two way communication and a second communication supporting one way communication. Embodiment 2 is directed to the purpose of letting the user of the terminal device of the business wireless system know that the user of the terminal device of the mobile communication system started talking while the terminal device of the business wireless system is transmitting a signal. For this purpose, when the sound from the terminal device of the mobile communication system is received while the terminal device of the business wireless system is transmitting a signal, the terminal device of the business wireless system is notified accordingly by using the downstream control channel. A prerequisite for this is that the terminal device of the business wireless system can receive a downstream control channel signal while it is transmitting a sound signal using the upstream channel. The communication system 100 according to Embodiment 2 is similar to that of Embodiment 1. The description below concerns a difference from Embodiment 1.

Figure 6:
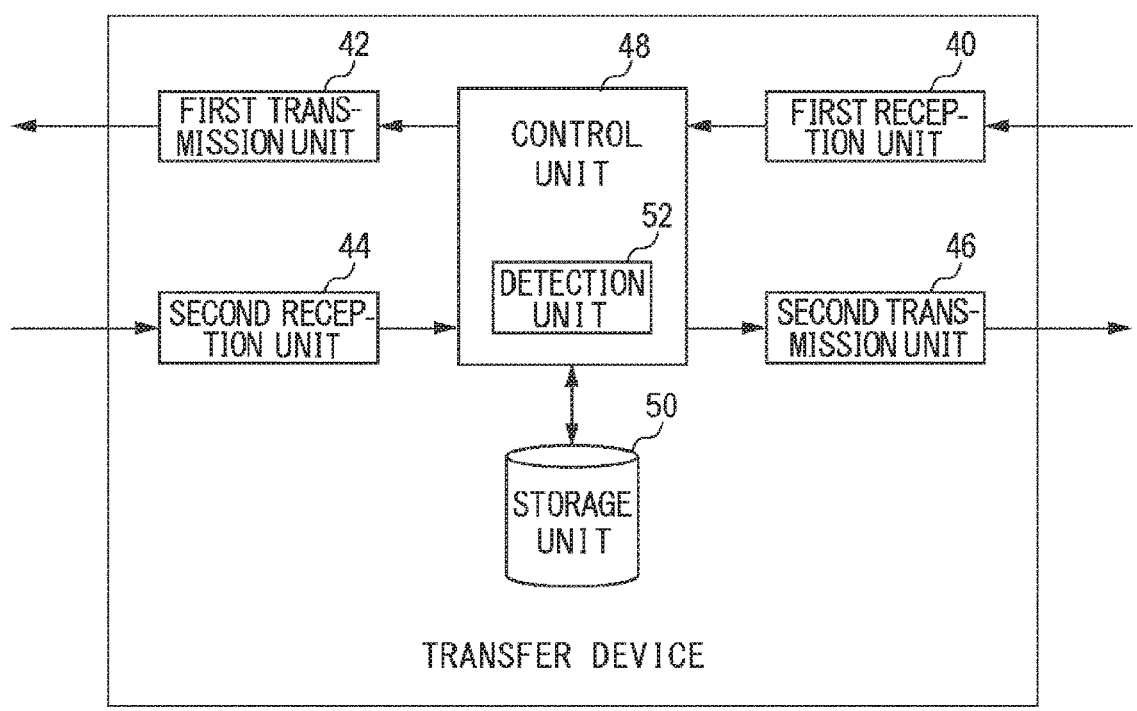
FIG. 6 shows a configuration of the transfer device according to Embodiment 2.

FIG. 6 shows a configuration of the transfer device 10 according to Embodiment 2. In addition to the features of FIG. 2, the transfer device 10 includes a detection unit 52. The detection unit 52 detects the reception of the sound signal in the first reception unit 40 while the second transmission unit 46 is transmitting the sound signal received in the second reception unit 44. When the detection unit 52 detects the reception, the control unit 48 outputs a signal indicating the reception of the sound signal in the first reception unit 40 (hereinafter, referred to as "notification") to the first transmission unit 42. The first transmission unit 42 transmits the notification to the business wireless terminal device 16 via the business wireless network 12 and the business wireless base station device 14. The notification is transmitted in the business wireless system 24 using the downstream control channel. Upon receipt of the notification using the downstream control channel, the business wireless terminal device 16 notifies the user of the reception by a beep sound, LED, or the like.

It has been assumed so far that the terminal device of the business wireless system can receive a downstream control channel signal while it is transmitting a sound signal using the upstream channel. If the terminal device of the business wireless system cannot receive a downstream control channel signal, however, the following process is performed. The business wireless terminal device 16 is further provided with a means for detecting whether the user is outputting a speech. When the means detects that the user's speech is suspended while a sound signal is being transmitted, the business wireless terminal device 16 requests the transfer device 10 via the business wireless base station device 14 and the business wireless network 12 to notify the business wireless terminal device 16 whether the sound from the mobile communication terminal device 22 is available and suspends the transmission concurrently. If a notification indicating whether the sound from the mobile communication terminal device 22 is available is requested by the business wireless terminal device 16, the control unit 48 causes the first transmission unit 42 to transmit the notification if the sound signal from the mobile communication terminal device 22 is stored in the storage unit 50. When the business wireless terminal device 16 receives from the transfer device 10 the notification indicating that the sound from the mobile communication terminal device 22 is available, the business wireless terminal device 16 notifies the user of the reception by a beep sound or LED. Further, the business wireless terminal device 16 starts the transmission of the sound signal when it detects that the user resumes talking. Even if the sound is not stored when the request from the business wireless terminal device 16 is received, the control unit 48 causes the first transmission unit 42 to transmit the notification as needed if the sound from the mobile communication terminal device 22 is input by the time that the business wireless terminal device 16 starts the transmission next.

Figure 7:
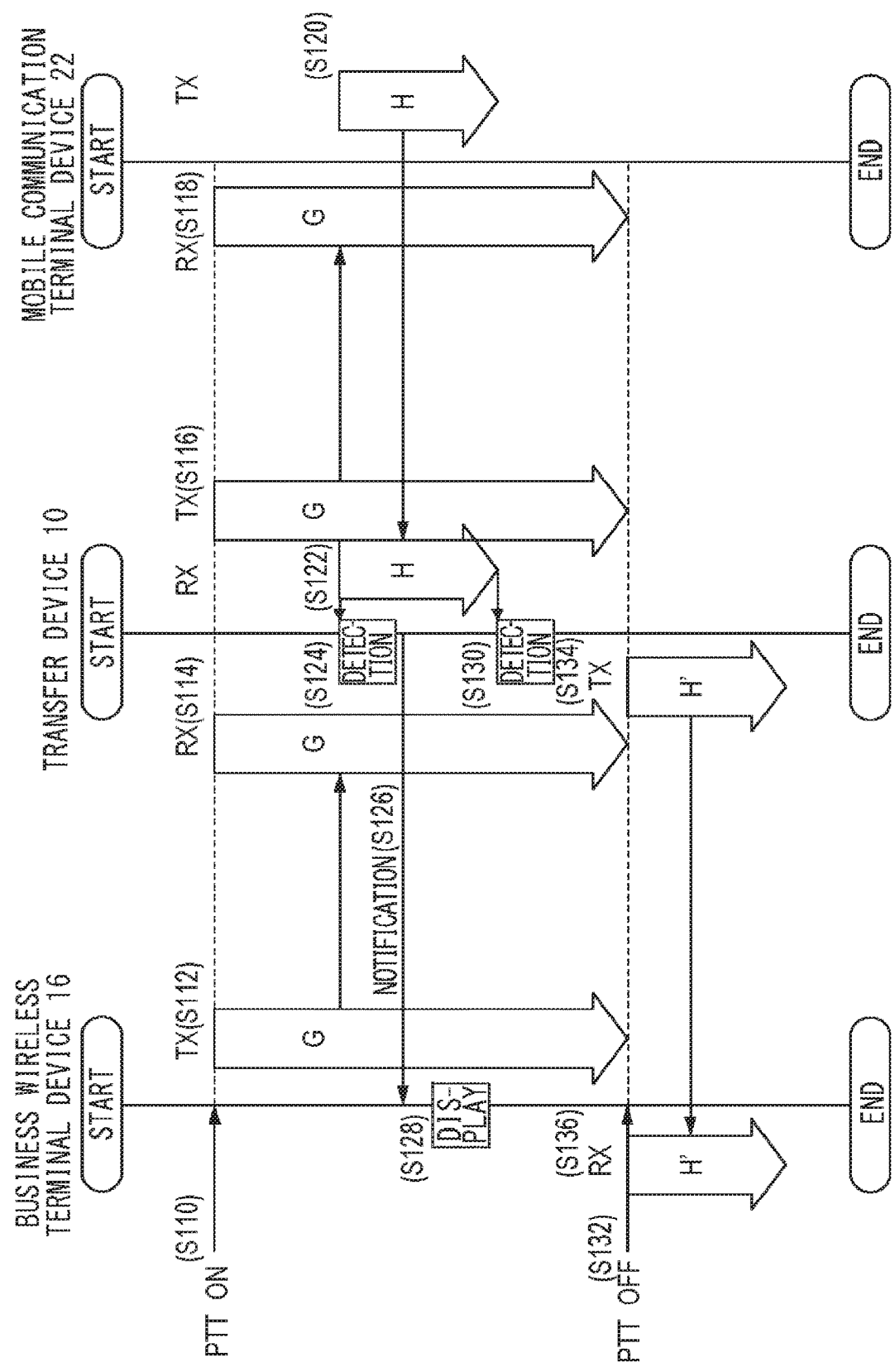
FIG. 7 shows steps of transfer by the communication system according to Embodiment 2.

FIG. 7 shows steps of transfer by the communication system 100 according to Embodiment 2. PTT is turned on in the business wireless terminal device 16 (S110). The business wireless terminal device 16 transmits a sound signal G (S112). The transfer device 10 receives the sound signal G (S114) and transmits the sound signal G (S116). The mobile communication terminal device 22 receives the sound signal G (S118). The mobile communication terminal device 22 transmits a sound signal H (S120). The transfer device 10 receives the sound signal H (S122).

The transfer device 10 detects the start of reception (S124). The transfer device 10 transmits a notification (S126). The business wireless terminal device 16 displays the notification (S128). The transfer device 10 detects the completion of reception (S130). PTT is turned off in the business wireless terminal device 16 (S132). The transfer device 10 transmits a sound signal H' (S134). The sound signal H' represents the sound signal H stored in the storage unit 50. The business wireless terminal device 16 receives the sound signal H' (S136).

Figure 8:
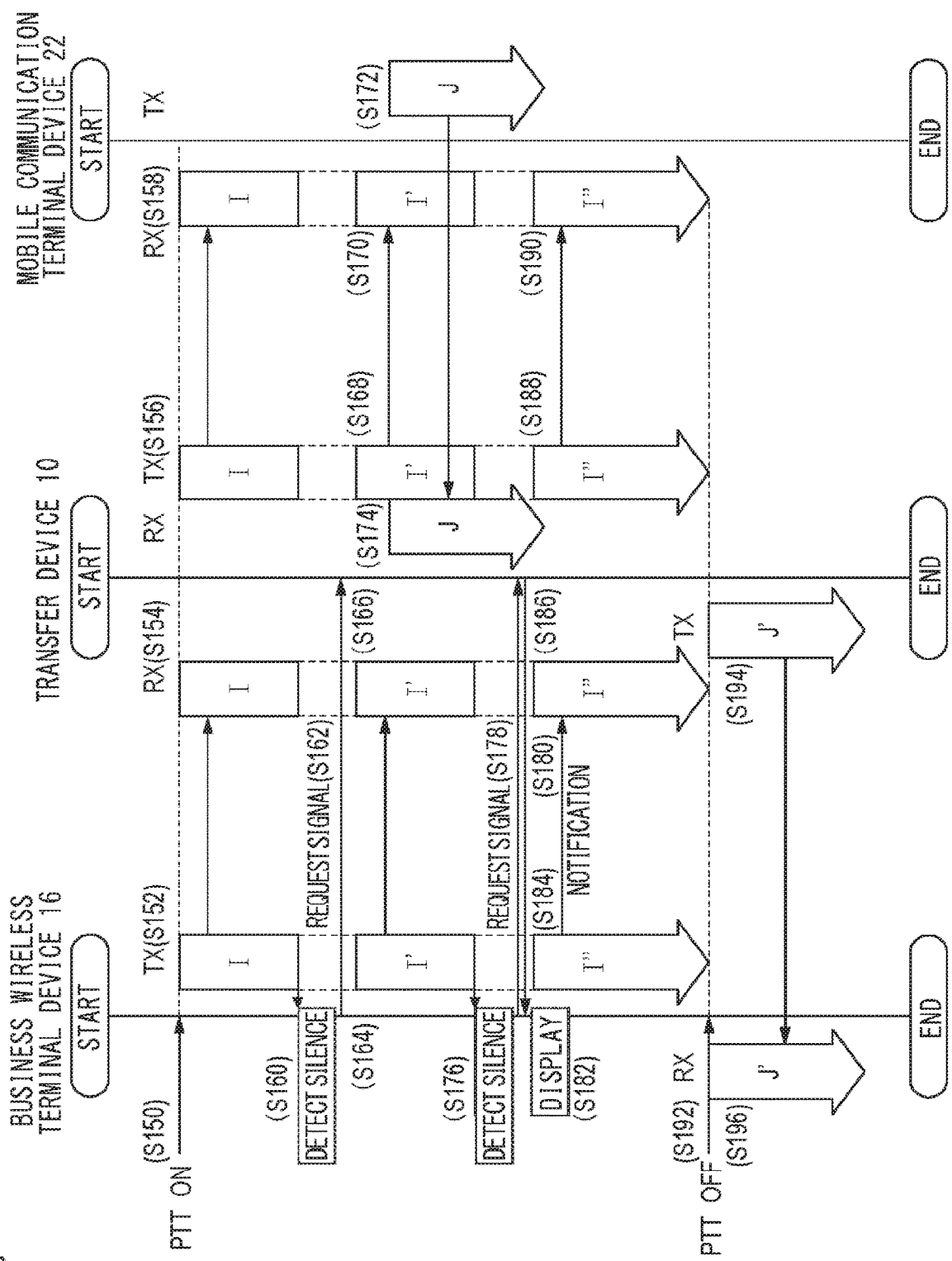
FIG. 8 shows alternative steps of transfer by the communication system according to Embodiment 2.

FIG. 8 shows alternative steps of transfer by the communication system 100 according to Embodiment 2. PTT is turned on in the business wireless terminal device 16 (S150). The business wireless terminal device 16 transmits a sound signal I (S152). The transfer device 10 receives the sound signal I (S154) and transmits the sound signal I (S156). The mobile communication terminal device 22 receives the sound signal I (S158). The business wireless terminal device 16 detects a silence (S160). The business wireless terminal device 16 transmits a request signal (S162).

The business wireless terminal device 16 transmits a sound signal I' (S164). The sound signal I' is a signal following the sound signal I. The transfer device 10 receives the sound signal I' (S166) and transmits the sound signal I' (S168). The mobile communication terminal device 22 receives the sound signal I' (S170). The mobile communication terminal device 22 transmits a sound signal J (S172). The transfer device receives the sound signal J (S174). The business wireless terminal device 16 detects a silence (S176). The business wireless terminal device 16 transmits a request signal (S178). The transfer device 10 transmits a notification (S180). The business wireless terminal device 16 displays the notification (S182).

The business wireless terminal device 16 transmits a sound signal I" (S184). The sound signal I" is a signal following the sound signal I'. The transfer device 10 receives the sound signal I" (S186) and transmits the sound signal I" (S188). The mobile communication terminal device 22 receives the sound signal I" (S190). PTT is turned off in the business wireless terminal device 16 (S192). The transfer device 10 transmits the sound signal J' (S194). The sound signal J' represents the sound signal J stored in the storage unit 50. The business wireless terminal device 16 receives the sound signal J' (S196).

According to this embodiment, the first transmission unit transmits a notification indicating the reception of the sound signal in the first reception unit so that the user is notified of the reception. Further, the user of the business wireless terminal device can be prompted to terminate the transmission since the user is notified of the reception. Still further, a notification is transmitted to the business wireless terminal device 16 not capable of receiving a downstream control channel signal, when a silent is created while the business wireless terminal device 16 is transmitting a sound signal using the upstream channel. Therefore, the user is notified of the reception.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In Embodiments 1 and 2, the first communication system is assumed to be the mobile communication system 26. Alternatively, the first communication system may be a wired telephone network. According to this variation, the flexibility of the configuration is improved.

What is claimed is:

1. A transfer device comprising:
 a first reception circuit that receives a sound signal destined to a second terminal device in a second communication system supporting one way communication from a first terminal device in a first communication system supporting two way communication;

a first transmission circuit that transmits the sound signal received in the first reception circuit to the second terminal device;

a second reception circuit that receives a sound signal destined to the first terminal device from the second terminal device;

a second transmission circuit that transmits the sound signal received in the second reception circuit to the first terminal device; and a storage circuit that stores the sound signal received in the first reception circuit if the second transmission circuit is transmitting the sound signal received in the second reception circuit, wherein if the sound signal is started to be stored in the storage circuit while the second transmission circuit is transmitting the sound signal received in the second reception circuit, the second transmission circuit reduces a speech speed in transmitting the sound signal received in the second reception circuit, the first transmission circuit transmits the sound signal stored in the storage circuit when reception of the sound signal in the second reception circuit is completed, and the second transmission circuit adjusts the speech speed so that a point of time when transmission of the sound signal received in the second reception circuit is completed approximates a point of time when transmission of the sound signal in the first transmission circuit is completed.

2. The transfer device according to claim 1, wherein even if the reception of the sound signal in the second reception circuit is completed while the storage circuit is storing the sound signal received in the first reception circuit, the storage circuit continues to store the sound signal received in the first reception circuit, and the first transmission circuit transfers the sound signal in the storage circuit in the order of storage when the reception of the sound signal in the second reception circuit is completed.

3. A transfer method comprising:

receiving a sound signal destined to a second terminal device in a second communication system supporting one way communication from a first terminal device in a first communication system supporting two way communication;

transmitting the sound signal received from the first terminal device to the second terminal device; receiving a sound signal destined to the first terminal device from the second terminal device;

transmitting the sound signal received from the second terminal device to the first terminal device; and storing the sound signal received from the first terminal device in a memory if the sound signal from the second terminal device is being transmitted to the first terminal device, wherein if the sound signal is started to be stored in said storing in the memory while the sound signal received from the second terminal device is being transmitted, said transmitting to the first terminal device reduces a speech speed in transmitting the sound signal received from the second terminal device, said transmitting to the second terminal device transmits the sound signal stored in the memory when reception of the sound signal from the second terminal device is completed, and said transmitting to the first terminal device adjusts the speech speed so that a point of time when transmission of the sound signal received from the second terminal device is completed approximates a point of time when transmission of the sound signal in said transmitting of the sound signal stored in the memory to the second terminal device is completed.

* * * * *